(12) United States Patent  
Takei (10) Patent No.: US 7,259,672 B2
(45) Date of Patent: Aug. 21, 2007

(54) CONTACTLESS IDENTIFICATION TAG (75) Inventor: Yoshiki Takei, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 167 days.

(21) Appl. No.: 10/806,950

(22) Filed: Mar. 23, 2004

(65) Prior Publication Data

US 2005/0001723 A1    Jan. 6, 2005

(30) Foreign Application Priority Data

Apr. 1, 2003    (JP) ............................. 2003-098272

(51) Int. Cl.
G08B 13/14    (2006.01)

(52) U.S. Cl. ................. 340/572.1; 340/572.6; 340/572.7; 340/572.8

(58) Field of Classification Search ............ 340/572.1, 340/572.6, 572.7, 572.8
See application file for complete search history.

(56) References Cited

U.S. PATENT DOCUMENTS 5,557,497 A * 9/1996 Ivanov et al. ............... 361/502
6,025,725 A * 2/2000 Gershenfeld et al. ....... 324/652
7,000,837 B2 * 2/2006 Akiho et al. ................ 235/451

FOREIGN PATENT DOCUMENTS

| JP | 07-055615  | 3/1995  |
| JP | 2001-174568 | 6/2001 |
| JP | 2002-324463 | 11/2002 |
| WO | 99/05272   | 2/1999  |
| WO | 03/009319  | 1/2003  |

* cited by examiner

Primary Examiner—Daryl C. Pope
(74) Attorney, Agent, or Firm—Hogan & Hartson LLP (57) ABSTRACT A contactless identification tag includes a capacitor and an electrostatic capacity variable device that varies an electrostatic capacity of the capacitor according to an externally applied compression force.

16 Claims, 9 Drawing Sheets

CONTACTLESS IDENTIFICATION TAG

BACKGROUND OF THE INVENTION

1. Field of the Invention

The present invention relates to contactless identification tags in which data is read or written in a contactless manner, and more particularly to the security of information.

2. Description of Related Art

Along with the popularization of contactless identification tags in recent years with which an external device reads and writes data in a contactless manner by receiving and sending an electromagnetic wave, the awareness towards information security in connection with the contactless identification tags has grown stronger. When the owner of a contactless identification tag carries the contactless identification tag in a bag and an external device that can instruct data reading and writing operations is brought in close contact with the bag by a third person, the danger of illegal access exists. Illegal access occurs when data is illegally read from the contactless identification tag, or data is illegally written in the contactless identification tag, while the owner is unaware of such incident.

Conventionally, there exists technology to prevent illegal reading from a transponding card. The technology requires the transponding card to be stored in a special case to form a circuit that connects a power source circuit of the transponding card to a grounding through a resistor such that no electric power is induced with an electromagnetic wave call. Also, there exists a technology to disable responses of a radio type information storage medium by housing the radio type information storage medium in a special case that is formed from a conductive material to thereby shut off an electromagnetic wave.

However, in both of these technologies described above, in order to prevent illegal accesses to a contactless identification tag by a third person other than the owner of the contactless identification tag, the owner needs to consciously perform certain tasks such as storing the contactless identification tag in the special case. In this situation, each time the contactless identification tag is used, it needs to be taken out from the special case. This is tedious. Also, the special case does not provide sufficient prevention against illegal access, because there is a possibility the special case is lost, and there is also a possibility to forget to store the card in the special case.

The present invention is made to solve the problems described above, and an advantage is to provide a contactless identification tag that readily enables secure prevention against illegal access without adding a special device for preventing illegal access.

SUMMARY OF THE INVENTION

To solve the problems described above, a first embodiment of the present invention concerns a contactless identification tag, which is equipped with a dielectric substrate provided thereon with an antenna coil that sends and receives an electromagnetic wave. A capacitor composed of a resonant circuit with the antenna coil is also provided. A data processing section processes data that is sent and received through the electromagnetic wave. According to the first embodiment of the present invention, the contactless tag further includes an electrostatic capacity variable device that varies the electrostatic capacity of the capacitor according to an externally applied compression force.

Here, a contactless identification tag is an information medium that is used in a Radio Frequency IDentification (RFID) system. The RFID system is an identification (ID) system that uses an electromagnetic wave or light as a communications medium. The RFID system is composed of a contactless identification tag that is an information medium and a reading/writing device called a reader/writer to thereby perform communications through contactless communications. The noncontact identification tag is equipped with three characteristics of: (1) being a size that can be readily carried, (2) storing information in an electronic circuit, and (3) communicating through contactless communications. Contactless identification tags may come in a variety of different types, such as, a label type, a card type, a coin type, a stick type, and the like. These types have close correlation with their applications. For example, types that are carried by persons may be in the form of a key holder that is modified from the card type or the label type. Also, as a semiconductor carrier ID, the stick type is the mainstream, and the coin type is the mainstream that are sewn in cloths relating to linens. Also, the card type may be equipped with a display section.

Also, a noncontact identification tag may be equipped with a storage region that is dedicated to data reading, or where data can be freely read and written. Further, a noncontact identification may be operated even without a battery through contactless power transmission from a reader/writer.

The RFID system is used for the purpose of unifying people, items and vehicles carrying noncontact identification tags with their information. In other words, where there are people, items and vehicles, required information can be retrieved at any time, and new information can be written as necessary.

There are four representative types of the RFID system, i.e., (1) an inductive coupling system that communicates with a contactless identification tag, primarily using mutual induction of coils by an alternating magnetic field, (2) an electromagnetic induction system that communicates with a contactless identification tag, primarily using an electromagnetic wave in a long or medium wavelength range of a 250 kHz or below, or a 13.56 MHz band, (3) a microwave system that performs data communications between a reader/writer antenna and a contactless identification tag with a microwave in a 2.45 GHz band, and (4) an optical system that is provided with an LED as a light generation source and a phototransistor as a light sensor to communicate with a contactless identification tag using the spatial transmission of light. The contactless identification tag in accordance with the present invention belongs to the system (2) described above, wherein an electromagnetic wave transmitted from an external device passes within the loop of the antenna coil. Alternating induced current corresponding to the frequency of the electromagnetic wave is generated by electromagnetic induction, and when the frequency of the induced current coincides with a frequency that can induce a resonant phenomenon of the resonant circuit, the resonant phenomenon causes the data processing section to start data processing.

With the structure of the first embodiment of the present invention, the contactless identification tag changes, by the electrostatic capacity variable device, and the electrostatic capacity of the capacitor when an external compression force is applied. According to the above, the resonant frequency of the resonant circuit of the contactless identification tag can be changed.

Also, a second embodiment of the present invention provides that the electrostatic capacity variable device changes the electrostatic capacity to a value that makes a resonant frequency of the resonant circuit not optimum for sending and receiving the electromagnetic wave in a state in which the compression force is not applied and a state in which the compression force is applied. The electrostatic capacity variable device also changes the electrostatic capacity to a value that makes the resonant frequency of the resonant circuit optimum for sending and receiving the electromagnetic wave in the state in which the compression force is not applied and the state in which the compression force is applied. In this case, upon application of an external compression force, the electrostatic capacity of the capacitor may have either of the two values, i.e., one with which the resonant frequency of the resonant circuit concurs with a desired communicable frequency range, or the other with which the same does not concur.

According to the structure described above, for example, in the state in which an external compression force is not applied, the electrostatic capacity variable device can maintain the electrostatic capacity of the capacitor at an electrostatic capacity with which the resonant frequency of the resonant circuit does not concur with a desired communicable frequency range. When an external compression force is applied, the electrostatic capacity variable device can change the electrostatic capacity of the capacitor to an electrostatic capacity with which the resonant frequency of the resonant circuit concurs with the desired communicable frequency range, and maintains the electrostatic capacity with which the resonant frequency concurs with the desired communicable frequency range.

It is noted that the structure in which, upon application of an external compression force, the electrostatic capacity changes to a value with which the resonant frequency of the resonant circuit concurs with the desired communicable frequency range, may be easier to use because it is in a state in which communications are difficult to make unless a certain action takes place such as positively gripping the contactless identification tag.

Also a third embodiment of the present invention provides that the electrostatic capacity variable device changes the electrostatic capacity by changing an opposing area of electrode conductors that compose the capacitor.

According to the structure described above, upon application of an external compression force, the contactless identification tag can change the electrostatic capacity by the electrostatic capacity variable device through changing the opposing area of the electrode conductors that compose the capacitor.

A fourth embodiment of the present invention provides that the capacitor is equipped with a first electrode conductor provided on one surface of the dielectric substrate, a second electrode conductor that is insulated from the first electrode conductor and is provided on the one surface of the dielectric substrate, and a third electrode conductor provided on another surface of the dielectric substrate opposite to the first electrode conductor and the second electrode conductor with the dielectric substrate is interposed in between. The electrostatic capacity variable device is equipped with a conductive member that makes conduction between the first electrode conductor and the second electrode conductor possible corresponding to the compression force, and changes the opposing area by switching a conductive state and a nonconductive state between the first electrode conductor and the second electrode conductor by the conductive member.

According to the structure described above, in the contactless identification tag, when an external compression force is not applied, the first electrode conductor and the second electrode conductor are in a mutually insulated state, and the opposing area of the electrode conductors composing the capacitor is defined only by the area of the first electrode conductor. When an external compression force is applied, the first electrode conductor and the second electrode conductor become conductive with each other by the conductive member. The opposing area of the electrode conductors composing the capacitor is defined by the sum of the areas of the first electrode conductor and the second electrode conductor. In this manner, the opposing area between the electrode conductors can be changed.

A fifth embodiment of the present invention provides that the conductive member is composed of a material having an elasticity, which is disposed opposite to both of the first electrode conductor and the second electrode conductor, elastically deforms upon application of the compression force so as to be able to contact both of the first electrode conductor and the second electrode conductor, and elastically returns upon removal of the compression force so as to be separated from at least one of the first electrode conductor and the second electrode conductor.

According to the structure described above, in the contactless identification tag, when an external compression force is not applied, the first electrode conductor and the second electrode conductor are insulated from each other, and the opposing area of the electrode conductors composing the capacitor is defined only by the area of the first electrode conductor. When an external compression force is applied, the conductive member elastically deforms to be able to contact both of the first electrode conductor and the second electrode conductor, such that the first electrode conductor and the second electrode conductor become conductive. The opposing area of the electrode conductors composing the capacitor is defined by the sum of the areas of the first electrode conductor and the second electrode conductor. When the compression force is removed, the conductive member elastically returns so as to be separated from at least one of the first electrode conductor and the second electrode conductor, such that the second electrode conductor and the first electrode conductor are insulated from each other. The opposing area returns to the area defined only by the first electrode conductor. In this manner, the opposing area of the electrode conductors can be changed.

Also, a sixth embodiment of the present invention provides that the capacitor is equipped with a first electrode conductor provided on one surface of the dielectric substrate and a second electrode conductor provided on another surface of the dielectric substrate opposite to the first electrode conductor with the dielectric substrate being interposed in between. The second electrode conductor is composed of an elastically deformable material. The opposing surface thereof with the first electrode conductor becomes larger when the compression force is applied than when the compression force is not applied.

According to the structure described above, in the contactless identification tag, when an external compression force is applied, the second electrode conductor elastically deforms such that its area becomes greater compared to the case when a compression force is not applied. When the compression force is removed, the second electrode conductor elastically returns such that its area returns to the original area. In this manner, the opposing area of the electrode conductors can be changed.

Also, a seventh embodiment of the present invention provides that the electrostatic capacity variable device changes the electrostatic capacity by changing a face-to-face gap between the electrode conductors that compose the capacitor.

By the structure described above, in the contactless identification tag, when an external compression force is applied, the electrostatic capacity variable device can change the face-to-face gap between the opposing electrode conductors that compose the capacitor, whereby the electrostatic capacity can be changed.

Also, an eighth embodiment of the present invention provides that the capacitor is equipped with a first electrode conductor provided on one surface of the dielectric substrate and a second electrode conductor disposed opposite to the first electrode conductor with the dielectric substrate being interposed in between and spaced by a gap from another surface of the dielectric substrate.

The electrostatic capacity variable device is equipped with a conductive member that supports the second electrode conductor in a manner approachable to the other surface of the dielectric substrate according to the compression force and maintains a conductive state with the resonant circuit. The electrostatic capacity variable device changes the face-to-face gap by switching with the conductive member an approached state and a removed state between the second electrode conductor and the other surface of the dielectric substrate.

By the structure described above, in the contactless identification tag, when an external compression force is not applied, the second electrode conductor is in a removed state in which it is spaced by a gap from the surface of the dielectric substrate and is separated at a face-to-face gap L1 from the first electrode conductor. When a compression force is applied, the second electrode conductor is placed in an approached state in which it approaches the surface of the dielectric substrate, and is separated at a face-to-face gap L2 from the first electrode conductor. In this manner, the gap between the opposing electrode conductors can be changed.

A ninth embodiment of the present invention provides the conductive member being composed of a material having an elasticity, elastically deforming upon application of the compression force such that the second electrode conductor approaches the other surface of the dielectric substrate, and elastically returning upon the removal of the compression force such that the second electrode conductor parts away from the other surface of the dielectric substrate.

By the structure described above, in the contactless identification tag, when an external compression force is not applied, the second electrode conductor is in a removed state in which it is spaced by a gap from the surface of the dielectric substrate and is separated at a face-to-face gap L1 from the first electrode conductor. When a compression force is applied, the second electrode conductor is placed in an approached state in which it elastically deforms to approach the surface of the dielectric substrate and is separated at a face-to-face gap L2 from the first electrode conductor. When the compression force is removed, the second electrode conductor elastically returns so as to be separated from the surface of the dielectric substrate and the second electrode conductor and the first electrode conductor return to the removed state with the face-to-face gap L1. In this manner, the gap can be changed.

Also, a tenth embodiment of the present invention provides that the capacitor is equipped with a first electrode conductor provided on one surface of the dielectric substrate and a second electrode conductor disposed opposite to the first electrode conductor with the dielectric substrate being interposed in between and spaced by a gap from another surface of the dielectric substrate. The second electrode conductor is composed of a material having an elasticity, a leg section conductive to the resonant circuit, and an electrode section that is supported by the leg section, elastically deforming upon application of the compression force such that the electrode section approaches the other surface of the dielectric substrate, and elastically returning upon removal of the compression force such that the electrode section parts away from the other surface of the dielectric substrate.

By the structure described above, in the contactless identification tag, when an external compression force is not applied, the electrode section of the second electrode conductor is in a removed state in which it is spaced by a gap from the surface of the dielectric substrate and is separated at a face-to-face gap L1 from the first electrode conductor. When a compression force is applied, the electrode section of the second electrode conductor is placed in an approached state in which it elastically deforms to approach the surface of the dielectric substrate and is separated at a face-to-face gap L2 from the first electrode conductor. When the compression force is removed, the electrode section of the second electrode conductor elastically returns so as to be separated from the surface of the dielectric substrate and the electrode section of the second electrode conductor and the first electrode conductor return to the removed state with the face-to-face gap L1. In this manner, the gap can be changed.

DETAILED DESCRIPTION OF THE PREFERRED EMBODIMENTS

Embodiments of the present invention will be described below with reference to the drawings.

Figure 1:
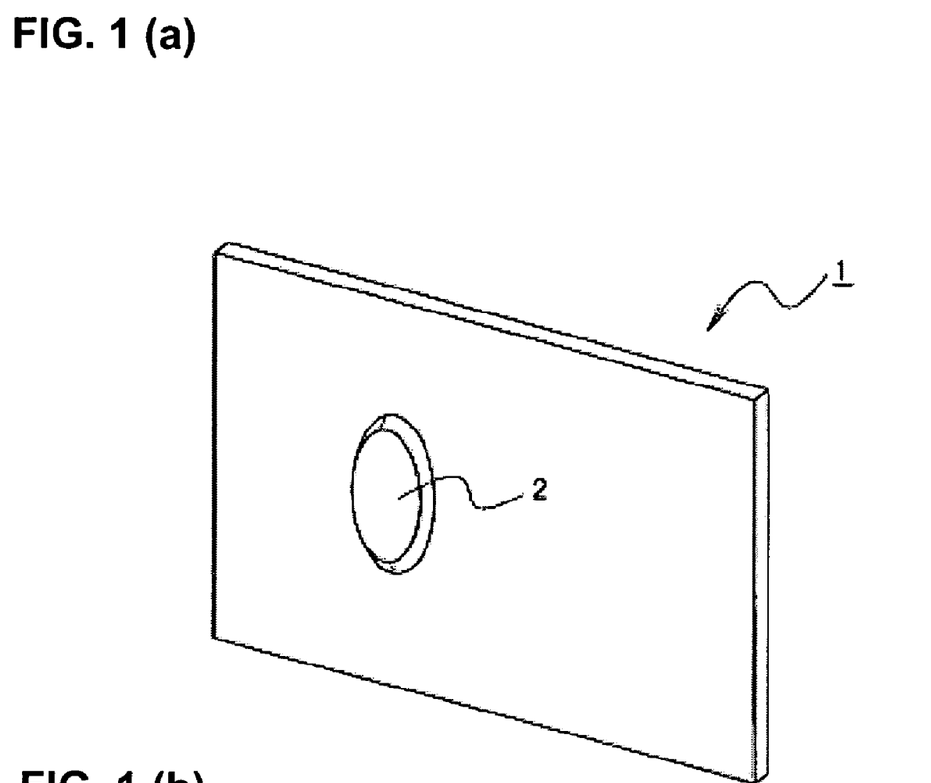
FIGS. 1(a) and 1(b) illustrate views indicating an external appearance of a contactless identification tag in accordance with a first embodiment of the present invention.

External views of a contactless identification tag 1 in accordance with a first embodiment of the present invention are shown in FIGS. 1(a) and 1(b), where FIG. 1(a) is a perspective view of the contactless identification tag 1, and FIG. 1(b) is a plan view of the contactless identification tag 1.

A characteristic appearance of the contactless identification tag 1 resides in that a compression force application section 2 that causes a change in an electrostatic capacity to be described below is provided to protrude slightly from the surface of the contactless identification tag 1.

Figure 2:
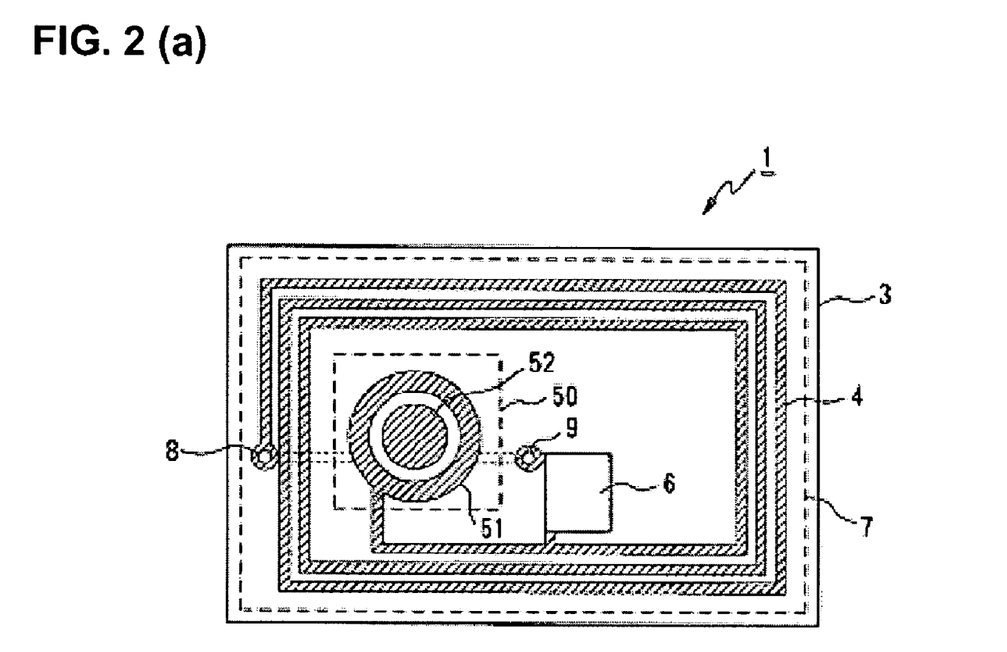
FIGS. 2(a) and 2(b) illustrate views of a main composition of a dielectric substrate in accordance with the first embodiment of the present invention.

A dielectric substrate 3 is housed inside the contactless identification tag 1 as shown in FIG. 2(a), which is a plan view indicating a main composition of the dielectric substrate 3. The dielectric substrate 3 is equipped thereon with an antenna coil 4 for sending and receiving an electromagnetic wave, a capacitor 50 that is composed of opposing electrode conductors with the dielectric substrate 3 being interposed in between, and a data processing section 6 that processes data sent or received via an electromagnetic wave. The capacitor 50 includes a first electrode conductor 51 provided on one surface of the dielectric substrate 3, a second electrode conductor 52 that is insulated from the first electrode conductor 51 and provided on the one surface of the dielectric substrate 3 and, as indicated in FIG. 2(b), which is a bottom view of the dielectric substrate 3, a third electrode conductor 53 provided on the other surface of the dielectric substrate 3 opposite to the first electrode conductor 51 and the second electrode conductor 52 with the dielectric substrate 3 being interposed in between. Further, the contactless identification tag 1 is equipped with a conductive member 60 (not shown in FIGS. 2(a) and 2(b)) that can conductively connect the first electrode conductor 51 and the second electrode conductor 52.

The first electrode conductor 51 of the capacitor 50 is in a ring shape to surround therein the second electrode conductor 52 that is insulated from the electrode conductor 51, and is conductively connected with one end section of the antenna coil 4. On the other hand, the third electrode conductor 53 is conductively connected to the other end section of the antenna coil 4 via a through hole pattern 8. Further, a resonant circuit 7 is formed with the antenna coil 4 and the capacitor 50 included therein. The data processing section 6 is connected at its one terminal to one end section of the antenna coil 4 and connected at its other terminal to the other end section of the antenna coil 4 via a through hole pattern 9.

The dielectric substrate 3 is a dielectric substrate that may be composed of an epoxy resin containing glass fibers. Components provided on the dielectric substrate 3 include the antenna coil 4, the first electrode conductor 51, the second electrode conductor 52, the third electrode conductor 53, the through hole pattern 8, the through hole pattern 9 and a land section (not shown) to be electrically connected to the data processing section 6 may be formed from conductive patterns by a printing technique or an etching technique. The through hole pattern is formed by providing a penetrated hole in the dielectric substrate 3, and providing a conductive member inside the penetrated hole to thereby conductively connect the top surface and the back surface of the dielectric substrate 3

Figure 3:
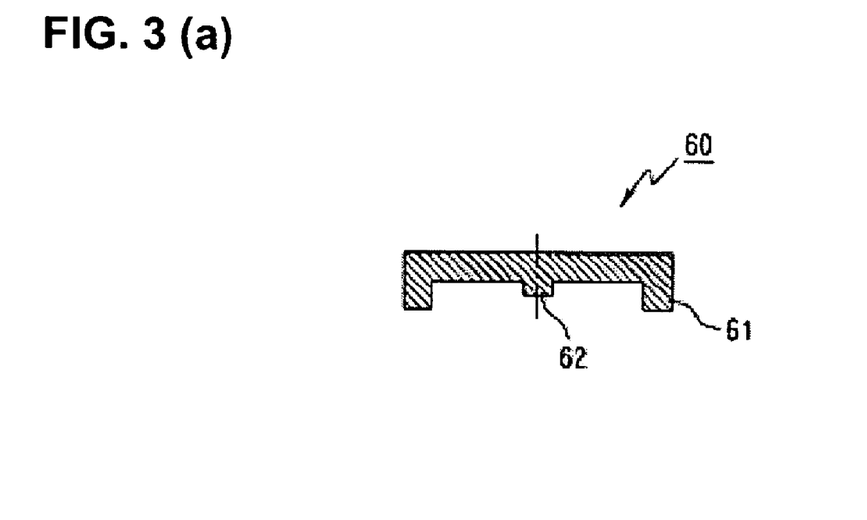
FIGS. 3(a), 3(b) and 3(c) illustrate details of an electrostatic capacity variable means in accordance with the first embodiment of the present invention.

As shown in FIG. 3(a), which is a cross-sectional view of the conductive member 60, the conductive member 60 may be obtained by forming a material having an elasticity such as conductive rubber by an injection molding technique, and has a generally circular overall configuration with a generally concave cross section. As shown in FIG. 3(b), which is a cross-sectional view taken along the line A-B of the compression force application section 2 in FIG. 1(b) of the contactless identification tag 1, the conductive member 60 has an edge section 61 of the concave configuration that is disposed opposite to the dielectric substrate 3 with the first electrode conductor 51 being interposed in between. The conductive member is always conductive with the first electrode conductor 51 through the edge section 61 of the concave configuration, and is provided on an inner bottom surface of the concave configuration with a convex section 62 that is spaced a distance from and opposite to the second electrode conductor 52.

The conductive member 60 is an electrostatic capacity variable means that changes an opposing area of the electrode conductors composing the capacitor 50. In a state indicated in FIG. 3(b) in which an external compression force is not applied, the second electrode conductor 52 and the first electrode conductor 51 are insulated from each other, such that the opposing area of the electrode conductors composing the capacitor 50 is defined only by the area of the first electrode conductor 51. The electrostatic capacity, in this state, is formed to have a value with which the resonant frequency of the resonant circuit 7 does not concur with a desired communicable frequency range.

As shown in FIG. 3(c) which indicates a state in which a compression force is applied to the conductive member 60, when an external compression force is applied, the conductive member 60 is elastically deformed such that the convex section 62 can contact the second electrode conductor 52, the first electrode conductor 51 and the second electrode conductor 52 become conductively connected, and the opposing area of the electrode conductors composing the capacity 50 is defined by the sum of the area of the first electrode conductor 51 and the area of the second electrode conductor 52. The electrostatic capacity, in this state, is formed to have a value with which the resonant frequency of the resonant circuit 7 concurs with a desired communicable frequency range.

While an external compression force is applied, the opposing area of the electrode conductors is maintained to be the sum of the area of the first electrode conductor 51 and the area of the second electrode conductor 52. Then, when the compression force is removed, the conductive member 60 elastically returns such that the convex section 62 is separated from the second electrode conductor 52. The second electrode conductor 52 is insulated from the first electrode conductor 51 and the opposing area returns to the area that is defined only by the first electrode conductor 51. Accordingly, the opposing area of the electrode conductors can be changed.

The characteristic appearance of the contactless identification tag 1 is effective in that the user can readily recognize a location to apply a compression force to the contactless identification tag.

Also, according to the above, for example, when it is held over an external device in its use, the contactless identification tag 1 is placed in a communicable state in a natural flow of action of the user who holds the contactless identification tag 1 at the compression force application section 2 over the external device. The contactless identification tag 1 can be immediately placed in a non-communicable state (a state in which communications are absolutely not possible or in a state in which communications can be made in a poor manner) as soon as the holding force is removed upon completion of use. The user does not need to add a special device for preventing illegal access such as a special case to the contactless identification tag and is released from onerous tasks such as attaching and detaching the special device each time the contactless identification tag is used. The danger of illegal access that may occur if the user forgets to attach the special device after use can be eliminated and therefore illegal access can be readily and securely prevented.

Also, there is another effect in that the durability of the contactless identification tag 1 does not have to be compromised as a large contact area can be formed between the electrostatic capacity variable means and any electrical contact point.

Also, the electrostatic capacity variable means may be provided with a function to cause a clicking action that is transmitted to the finger tip when the electrostatic capacity changes as a compression force is applied at the compression force application section 2 and when the electrostatic capacity changes as the compression force is removed from the compression force application section 2, which is effective in that the user can recognize changes in the electrostatic capacity.

The conductive member 60 may be formed from a spring plate material such as phosphor bronze or stainless steel by a press working technique, which provides effects similar to the above.

A second embodiment of the present invention will be described with reference to FIGS. 4(a), 4(b), 5(a) and 5(b). It is noted that the external appearance of the second embodiment is the same as that of the first embodiment, and therefore drawings of its external appearance are omitted. Also, only portions of the second embodiment which are different from the first embodiment will be described.

Figure 4:
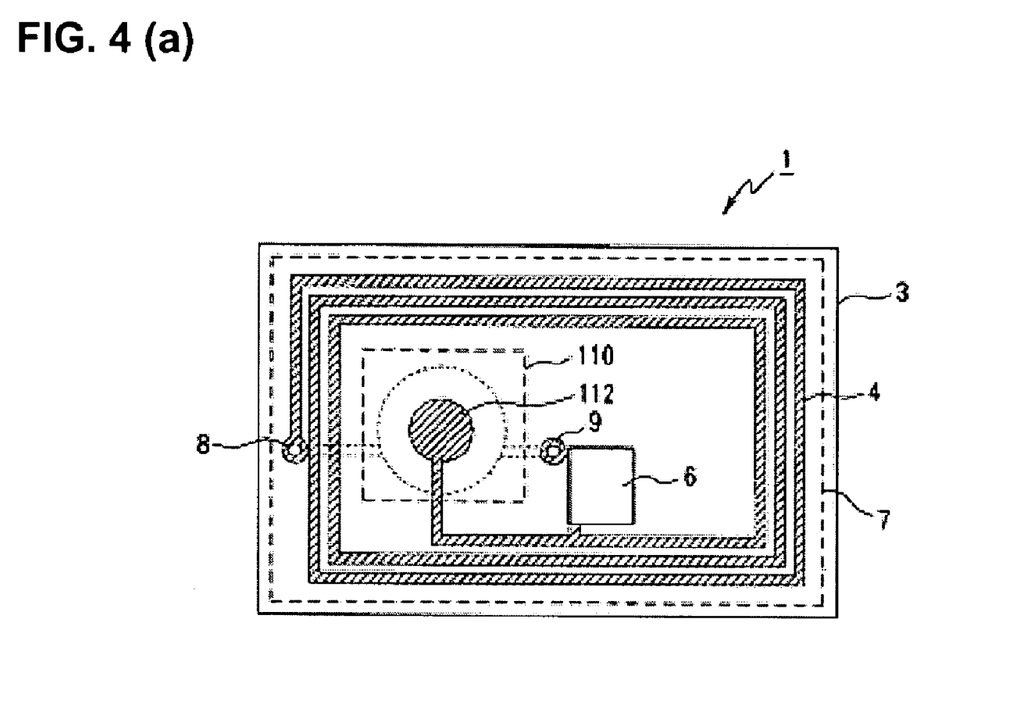
FIGS. 4(a) and 4(b) illustrate views of a main composition of a dielectric substrate in accordance with a second embodiment of the present invention.

A main composition of a dielectric substrate 3 in accordance with the second embodiment of the present invention is shown in FIGS. 4(a) and 4(b), where FIG. 4(a) is a plan view of the dielectric substrate 3 and FIG. 4(b) is a bottom view of the dielectric substrate 3.

As shown in FIGS. 4(a) and 4(b), a capacitor 110 includes a first electrode conductor 111 provided on one surface of the dielectric substrate 3 and a second electrode conductor 112 provided on the other surface of the dielectric substrate 3 opposite to the first electrode conductor 111 with the dielectric substrate 3 being interposed in between.

The second electrode conductor 112 is conductively connected to one end section of an antenna coil 4 and the first electrode conductor 111 is conductively connected to the other end section of the antenna coil 4 through a through hole pattern 8. The first electrode conductor 111 is formed from conductive patterns by a printing technique or an etching technique. The second electrode conductor 112 has a generally cylindrical overall configuration, and may be formed from a material having an elasticity such as conductive rubber by an injection molding technique.

Figure 5:
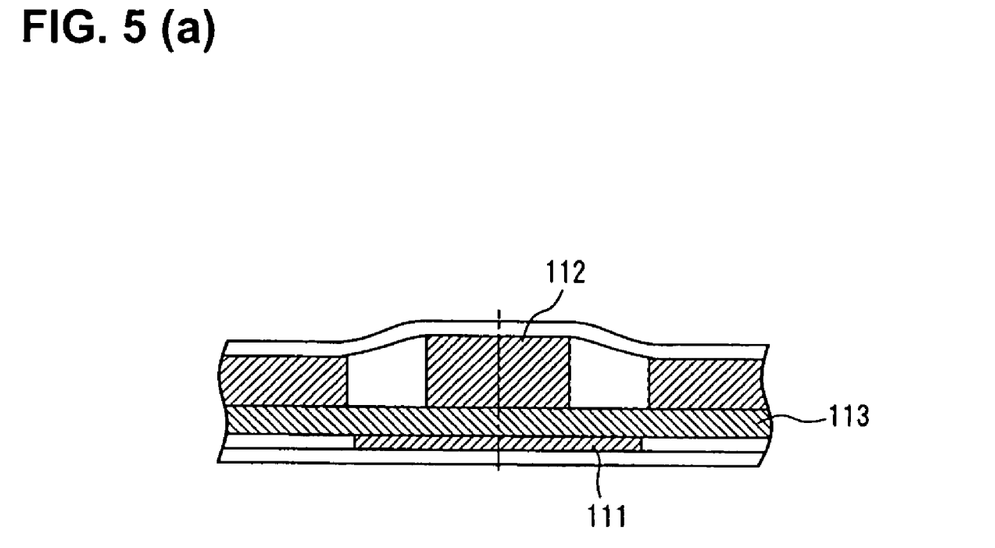
FIGS. 5(a) and 5(b) illustrate details of an electrostatic capacity variable means in accordance with the second embodiment of the present invention.

The second electrode conductor 112 is an electrostatic capacity variable means that changes an opposing area of electrode conductors composing the capacitor 110. As indicated in FIG. 5(a), which is a cross-sectional view taken along the line A-B of a compression force application section 2 indicated in FIG. 1(b) of the contactless identification tag 1, in a state in which an external compression force is not applied, the second electrode conductor 112 has a smaller area compared to the first electrode conductor 111. The electrostatic capacity, in this state, is formed to have a value with which the resonant frequency of the resonant circuit 7 does not concur with a desired communicable frequency range.

As indicated in FIG. 5(b) that shows a state in which a compression force is applied to the second electrode conductor 112, when an external compression force is applied, the second electrode conductor 112 elastically deforms such that its area becomes greater compared to the case when a compression force is not applied, and the opposing area with the first electrode conductor 111 increases. The electrostatic capacity, in this state, is formed to have a value with which the resonant frequency of the resonant circuit 7 concurs with a desired communicable frequency range.

While the external compression force is applied, the state in which the opposing area is increased is maintained and when the compression force is removed, the second electrode conductor 112 elastically returns to resume the area it had before the compression force was applied. Thus, the opposing area of the electrode conductors can be changed.

The present embodiment also provides effects similar to those provided by the first embodiment described above.

A third embodiment of the present invention will be described with reference to FIGS. 6(a), 6(b), 7(a), 7(b) and 7(c). It is noted that the external appearance of the third embodiment is the same as that of the first embodiment, and therefore drawings of its external appearance are omitted. Also, only portions of the third embodiment which are different from the first embodiment will be described.

Figure 6:
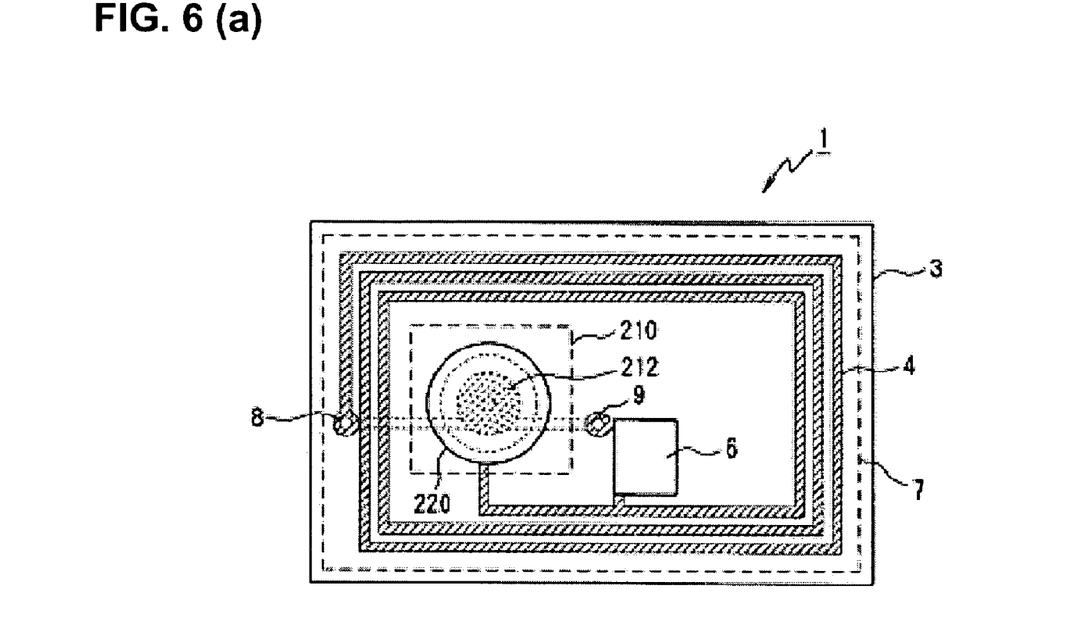
FIGS. 6(a) and 6(b) illustrate views of a main composition of a dielectric substrate in accordance with a third embodiment of the present invention.

A main composition of a dielectric substrate 3 in accordance with the third embodiment of the present invention is shown in FIGS. 6(a) and 6(b), where FIG. 6(a) is a plan view of the dielectric substrate 3 and FIG. 6(b) is a bottom view of the dielectric substrate 3.

As shown in FIGS. 6(a) and 6(b), a capacitor 210 includes a first electrode conductor 211 provided on one surface of the dielectric substrate 3, and a second electrode conductor 212 disposed on the other surface of the dielectric substrate 3 opposite to the first electrode conductor 211 with the dielectric substrate 3 being interposed in between. Further, the contactless identification tag 1 is equipped with a conductive member 220 that supports the second electrode conductor 212 and can conductively connect the second electrode conductor 212 with the antenna coil 4.

Figure 7:
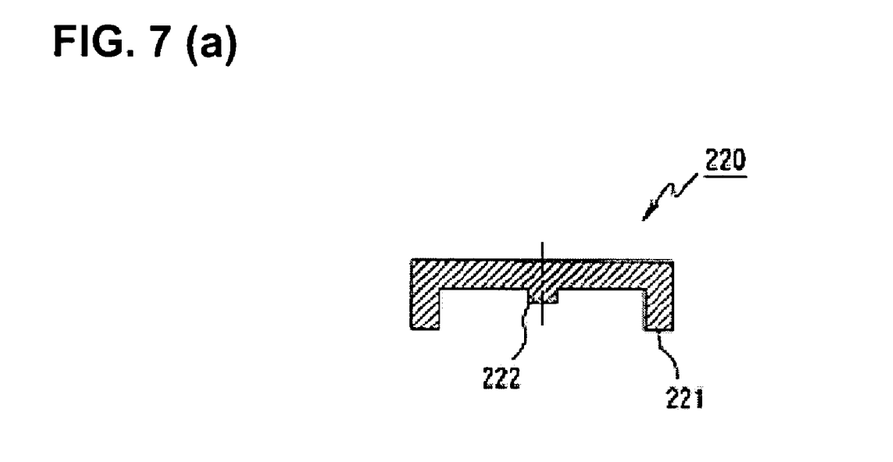
FIGS. 7(a), 7(b) and 7(c) illustrate details of an electrostatic capacity variable means in accordance with the third embodiment of the present invention.

As indicated in FIG. 7(b), which is a cross-sectional view taken along the line A-B of a compression force application section 2 indicated in FIG. 1(b) of the contactless identification tag 1, the second electrode conductor 212 is supported by the conductive member 220, and spaced by a gap from the surface of the dielectric substrate 3. As shown in FIG. 7(a), which is a cross-sectional view of the conductive member 220, the conductive member 220 may be obtained by forming a material having an elasticity such as conductive rubber by an injection molding technique. The conductive member has a generally circular overall configuration with a generally concave cross section and is provided with a convex section 222 on an inner bottom surface of the concave configuration which supports the second electrode conductor 212.

The second electrode conductor 212 and one end section of an antenna coil 4 are conductively connected through an edge section 221 of the concave configuration of the conductive member 220 and the first electrode conductor 211 is conductively connected to another end section of the antenna coil 4 via a through hole pattern 8.

The first electrode conductor 211 may be formed from conductive patterns by a printing technique or an etching technique. The second electrode conductor 212 may be formed from a conductive plate member such as a copper plate, a steel plate, an aluminum plate or the like by a press working technique and is affixed to the conductive member 220 by a technique using adhesive, welding, caulking or the like.

The conductive member 220 is an electrostatic capacity variable means that changes a face-to-face gap of the electrode conductors composing the capacitor 210. In a state shown in FIG. 7(b) in which an external compression force is not applied, the second electrode conductor 212 and the first electrode conductor 211 are in a removed state with a face-to-face gap L1 provided between them. The electrostatic capacity, in this state, is formed to have a value with which the resonant frequency of the resonant circuit 7 does not concur with a desired communicable frequency range.

As indicated in FIG. 7(c) that shows a state in which a compression force is applied to the conductive member 220, when an external compression force is applied, the conductive member 220 elastically deforms such that the second electrode conductor 212 approaches the surface of the dielectric substrate 3 and the second electrode conductor 212 and the first electrode conductor 211 are placed in an approached state with a face-to-face gap L2 provided between them. The electrostatic capacity, in this state, is formed to have a value with which the resonant frequency of the resonant circuit 7 concurs with a desired communicable frequency range.

While a compression force is applied externally, the face-to-face gap between the electrode conductors is maintained at L2. When the compression force is removed, the conductive member 220 elastically returns such that the second electrode conductor 212 is separated from the surface of the dielectric substrate 3 and the face-to-face gap returns to L1. Accordingly, the face-to-face gap of the electrode conductors can be changed. The present embodiment provides effects similar to those of the first embodiment.

The conductive member 220 may be formed from a spring plate material such as phosphor bronze or stainless steel by a press working technique, which provides effects similar to the above.

A fourth embodiment of the present invention will be described with reference to FIGS. 8(a), 8(b), 9(a), 9(b) and 9(c). It is noted that the external appearance of the fourth embodiment is the same as that of the first embodiment, and therefore drawings of its external appearance are omitted. Also, only portions of the fourth embodiment which are different from the first embodiment will be described.

Figure 8:
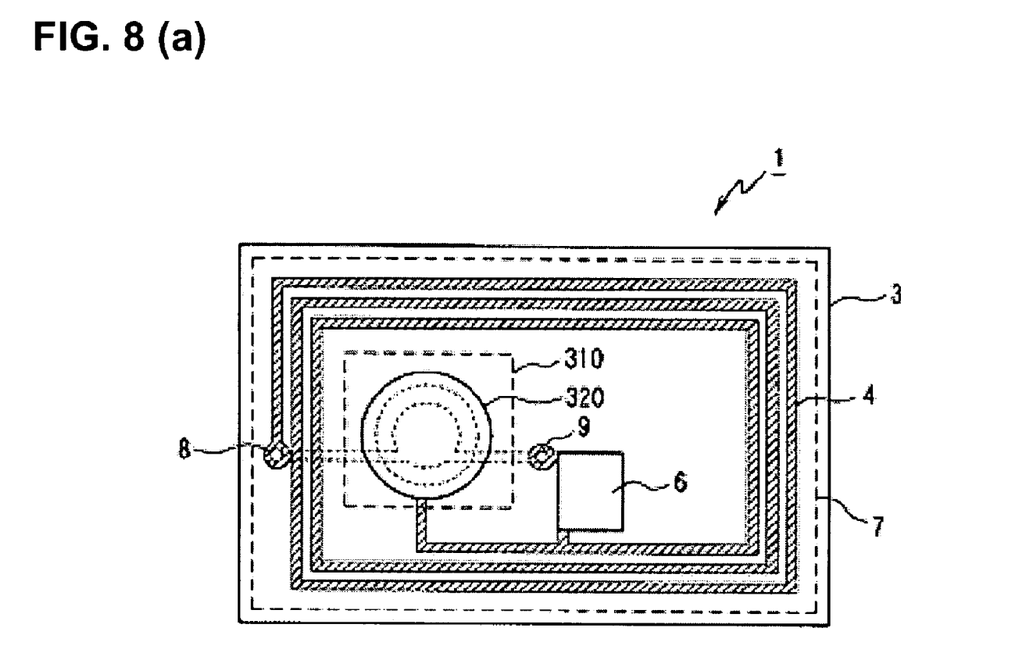
FIGS. 8(a) and 8(b) illustrate views of a main composition of a dielectric substrate in accordance with a fourth embodiment of the present invention.

A main composition of a dielectric substrate 3 in accordance with the fourth embodiment of the present invention is shown in FIGS. 8(a) and 8(b), where FIG. 8(a) is a plan view of the dielectric substrate 3, and FIG. 8(b) is a bottom view of the dielectric substrate 3.

As shown in FIGS. 8(a) and 8(b), a capacitor 310 includes a first electrode conductor 311 provided on one surface of the dielectric substrate 3, and a second electrode conductor 320 provided on the other surface of the dielectric substrate 3 opposite to the first electrode conductor 311 with the dielectric substrate 3 being interposed in between.

Figure 9:
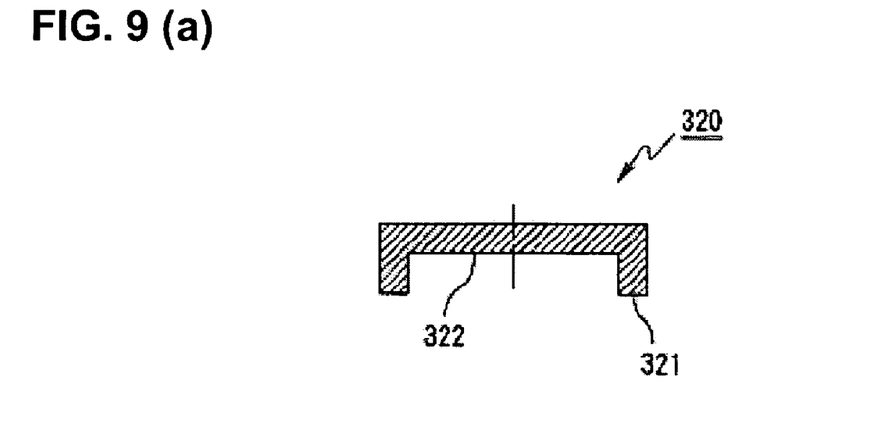
FIGS. 9(a), 9(b) and 9(c) illustrate details of an electrostatic capacity variable means in accordance with the fourth embodiment of the present invention.

As shown in FIG. 9(a), which is a cross-sectional view of the second electrode conductor 320. The second electrode conductor 320 has a generally circular overall configuration with a generally concave cross section and is composed of an electrode section 322 and a leg section 321 that supports the electrode section 322. Further, as indicated in FIG. 9(b), which is a cross-sectional view taken along the line A-B of a compression force application section 2 indicated in FIG. 1(b) of the contactless identification tag 1, the electrode section 322 is disposed opposite the first electrode conductor 311 with the dielectric substrate 3 being interposed in between, in a manner that a gap is provided between the electrode section 322 and the surface of the dielectric substrate 3.

The second electrode conductor 320 and one end section of an antenna coil 4 are always conductively connected through the leg section 321 of the second electrode conductor 320 and the first electrode conductor 311 is conductively connected to another end section of the antenna coil 4 via a through hole pattern 8.

The first electrode conductor 311 may be formed from conductive patterns by a printing technique or an etching technique. The second electrode conductor 320 may be formed by a material having an elasticity such as conductive rubber by an injection molding technique.

The second electrode conductor 320 is an electrostatic capacity variable means that changes an opposing area of electrode conductors composing the capacitor 310. In a state indicated in FIG. 9(b) in which an external compression force is not applied, the electrode section 322 of the second electrode conductor 320 and the first electrode conductor 311 are in a removed state with a face-to-face gap L1 provided between them. The electrostatic capacity, in this state, is formed to have a value with which the resonant frequency of the resonant circuit 7 does not concur with a desired communicable frequency range.

As indicated in FIG. 9(c) that shows a state in which a compression force is applied to the second electrode conductor 320, when an external compression force is applied, the second electrode conductor 320 elastically deforms such that the electrode section 322 approaches the surface of the dielectric substrate 3, and the electrode section 322 and the first electrode conductor 311 are placed in an approached state with a face-to-face gap L2 provided between them. The electrostatic capacity, in this state, is formed to have a value with which the resonant frequency of the resonant circuit 7 concurs with a desired communicable frequency range.

While a compression force is applied externally, the face-to-face gap between the electrode conductors is maintained at L2. When the compression force is removed, the second electrode conductor 320 elastically returns such that the electrode section 322 is separated from the surface of the dielectric substrate 3 and the face-to-face gap returns to L1. Accordingly, the face-to-face gap of the electrode conductors can be changed. The present embodiment also provides effects similar to those of the first embodiment.

It is noted that the second electrode conductor 320 may be formed from a spring plate material such as phosphor bronze or stainless steel by a press working technique, which provides effects similar to the above.

Also, the present invention further provides a housing case that is equipped with a main body having a bag-like housing section that stores the contactless identification tag 1 in accordance with any one of the first through fourth embodiments of the present invention. A convex configuration is provided at a position opposite to the compression force application section and presses the compression force application section in a state in which the contactless identification tag 1 in accordance with any one of the first through fourth embodiments of the present invention is stored in the hosing section.

According to the above, in a state in which the contactless identification tag 1 in accordance with any one of the first through fourth embodiments of the present invention is stored in the hosing section, the electrostatic capacity variable means can maintain the electrostatic capacity at a value with which the resonant frequency concurs with a desired communicable frequency range.

According to the above, for example, when a RFID system that uses the contactless identification tag 1 in accordance with any one of the first through fourth embodiments of the present invention is used as a security system that controls entry of unauthorized persons, and security gates and reader/writers are installed at various places in a building, the following effects will be provided. Even when the user is holding luggage with both of his/her hands, he/she can pass the security gates without holding the contactless identification tag 1 if the contactless identification tag 1 is stored in a housing case in advance.

Also, in the first through fourth embodiments of the present invention described above, in a state in which an external compression force is applied, the electrostatic capacity may be formed to have a value with which the resonant frequency does not concur with a desired communicable frequency range and in a state in which an external compression force is not applied, the electrostatic capacity may be formed to have a value with which the resonant frequency concurs with a desired communicable frequency range.

According to the above, by storing the contactless identification tag 1 in the housing case, a non-communicable state can be maintained and external impacts are buffered such that the contactless identification tag 1 can be protected.

Also, in the first through fourth embodiments described above, in one state in which an external compression force is not applied and a state in which the same is applied, the electrostatic capacity may be formed to have a value with which the resonant frequency is within a communicable frequency range and the distance between the contactless identification tag 1 and a reader/writer reaches a maximum distance. In the other state in which an external compression force is not applied and the state in which the same is applied, the electrostatic capacity may be formed to have a value with which the resonant frequency is within a communicable frequency range and the distance between the contactless identification tag 1 and a reader/writer reaches a minimum distance. In this case, when an external compression force is applied, the electrostatic capacity can have either of two values; one with which the communicable distance between the contactless identification tag 1 and a reader/writer reaches a maximum distance, or the other with which the same reaches a minimum distance.

According to the above, for example, in a state in which an external compression force is not applied, the contactless identification tag 1 is difficult to communicate unless it is brought in close proximity to a reader/writer, such that the risk of illegal accesses can be reduced. When an external compression force is applied, communications are possible even when it is far from a reader/writer. For example, even when a security gate is crowded for passage, there is no need to wait in line, which is effective in constructing an efficient security system. Also, by storing the tag in the housing case, the security system can be made more efficient.

It is noted that the composition, in which the electrostatic capacity upon application of an external compression force has a value with which the communicable distance between the contactless identification tag 1 and a reader/writer reaches a maximum distance, may be easier to use because it is in a state in which communications are difficult unless a certain action takes place such as positively gripping the contactless identification tag 1.

In the first through fourth embodiments described above, a compression force application section that causes a change in the electrostatic capacity of a contactless identification tag is provided in a manner slightly protruded from the surface of the contactless identification tag, but it is not limited to this structure. The height of the compression force application section may be leveled with the surface of the contactless identification tag, and the position of the compression force application section may be indicated by a printed mark or the like, or may be indicated by a bank having a convex cross section or a groove having a concave cross section provided around the compression force application section on the surface of the contactless identification tag.

According to the above, when the contactless identification tag is carried in an ordinary card case when it is not used, it has few malfunctions and is not bulky.

What is claimed is:

1. A contactless identification tag comprising:
a capacitor; and
an electrostatic capacity variable device that varies an electrostatic capacity of the capacitor according to an externally applied compression force,
wherein the electrostatic capacity variable device changes the electrostatic capacity to a value that makes a resonant frequency of the resonant circuit not optimum for sending and receiving the electromagnetic wave in one of a state in which a compression force is not applied and a state in which the compression force is applied, and changes the electrostatic capacity to a value that makes the resonant frequency of the resonant circuit optimum for sending and receiving the electromagnetic wave in the state in which the compression force is not applied and the state in which the compression force is applied.

2. A contactless identification tag, comprising:
an antenna coil that sends and receives an electromagnetic wave;
a capacitor that composes a resonant circuit with the antenna coil; and
a data processing section that processes data which the identification tag receives through the electromagnetic wave and which the identification tag sends through the electromagnetic wave;
the capacitor including a first electrode, a second and a dielectric substrate that is disposed between the first electrode and the second electrode, and
an electrostatic capacitance of the capacitor changing according to a face-to-face distance between the first electrode and the second electrode or an area of a part of the second electrode that forms the electrostatic capacitance with the first electrode.

3. The contactless identification tag according to claim 2, the electrostatic capacitance having at least first value and second value,
the first value no making a resonant frequency of the resonant circuit not optimum for sending and receiving the electromagnetic wave, and
the second value making the resonant frequency of the resonant circuit optimum for sending and receiving the electromagnetic wave.

4. The contactless identification tag according to claim 2,
the face-to-face distance or the area of the part of the second electrode changing when an external force is applied to at least a part of the contactless identification tag.

5. The contactless identification tag according to claim 4 wherein the electrostatic capacitance changes to a value that makes a resonant frequency of the resonant circuit not optimum for sending and receiving the electromagnetic wave in one of a state in which the external force is not applied and a state in which the external force is applied, and changes to a value that makes the resonant frequency of the resonant circuit optimum for sending and receiving the electromagnetic wave in the state in which the external force is not applied and the state in which the external force is applied.

6. The contactless identification tag according to claim 4, further comprising:
a conductive member that includes a first portion and a second portion,
the second electrode including a third electrode and a fourth electrode,
the first portion being disposed opposite to the third electrode,
the first portion contacting the third electrode
the second portion being disposed opposite to the fourth electrode,
the second portion being spaced by a gap from the fourth electrode, the fourth electrode electrically connecting to the third electrode when the fourth electrode contacts the second portion by applying the external force to the conductive member.

7. The contactless identification tag according to claim 6, the third electrode surrounding therein the fourth electrode.

8. The contactless identification tag according to claim 6, the conductive member is composed of a material having an elasticity,
the conductive member elastically deforming such that the second portion contacting the fourth electrode when the external force is applied.

9. The contactless identification tag according to claim 6, a cross section of the conductive member being concave shape,
the first portion being an edge section of the conductive member, and
the second portion being a bottom section of the conductive member.

10. The contactless identification tag according to claim 9, the second portion having a convex section on the bottom section that is disposed opposite to the fourth electrode and spaced by a gap from the fourth electrode.

11. The contactless identification tag according to claim 6, the conductive member is composed of a material having elasticity,
a conduction state and a insulating state of the third electrode with the fourth electrode being switched according to the external force.

12. The contactless identification tag according to claim 11,
the conductive member elastically returning such that the second portion separating from the fourth electrode when the external force is removed after the external force is applied.

13. The contactless identification tag according to claim 4, the second electrode is composed of a material having an elasticity,
the area of the part of the second electrode depending on a strength of the external force.

14. The contactless identification tag according to claim 4, further comprising a conductive member that includes a convex section and an edge section,
the convex section contacting one surface of the second electrode,
the edge section contacting the antenna coil,
the second electrode being disposed above the dielectric substrate by the conductive member,
the second electrode being spaced by a gap from the dielectric substrate, and
the face-to-face distance changing according to a changes of a distance between the second electrode and the dielectric substrate that occurs when the external force applied.

15. The contactless identification tag according to claim 14, the conductive member is composed of a material having an elasticity,
the conductive member elastically deforming such that the second electrode approaching the dielectric substrate when the external force is applied.

16. The contactless identification tag according to claim 15,
the conductive member elastically returning such that the second electrode removing from the dielectric substrate when the external force is removed after the external force is applied.

* * * * *